Patented Feb. 5, 1952

2,584,531

UNITED STATES PATENT OFFICE 2,584,531

METAL MOLYBDITE CATALYZED HYDROGENATION PROCESS

Herrick R. Arnold, Wilmington, and James E. Carnahan, New Castle, Del., assignors to E. I. du Pont de Nemours & Company, Wilmington, Del., a corporation of Delaware No Drawing. Application February 9, 1950, Serial No. 143,352

21 Claims. (Cl. 260—666)

This invention relates to hydrogenation processes and more particularly to a novel catalytic hydrogenation process.

This application is a continuation-in-part of our copending application Ser. No. 111,982, filed August 23, 1949, now U. S. Patent 2,572,300.

It is an object of this invention to provide a novel catalytic hydrogenation process. Another object is to provide a novel hydrogenolysis process. Other objects will appear hereinafter.

This invention provides a hydrogenation process which comprises reacting with hydrogen an organic compound capable of undergoing hydrogenation in the presence of a molybdite of a metal whose ions are soluble in excess aqueous ammonia, that is whose ions are soluble in aqueous ammonia in amount greater than that stoichiometrically required to precipitate the metal ion. These catalysts are molybdites of metals whose ions are not precipitated as insoluble oxides or hydroxides when solutions of their salts are treated with excess aqueous ammonia.

In practicing one embodiment of this invention, a pressure reactor is charged with the catalyst and material to be hydrogenated; and if desired, an inert solvent. The reactor is then charged with hydrogen and heating and agitation are started. The pressure within the system is maintained by periodic injections of hydrogen to compensate for that which has been absorbed in the reaction. After reaction is complete, as evidenced by cessation of hydrogen absorption, the reactor is permitted to cool, opened, and the contents discharged and filtered or centrifuged to remove the catalyst. The reaction product, if not pure directly, can be isolated by distillation or by other means known to those skilled in the art.

The examples which follow are submitted to illustrate and not to limit this invention.

Example I

A 400-ml. pressure reactor was charged with 105 g. (1.22 moles) of cyclohexene and 2.5 g. of nickel molybdite catalyst, which was prepared as described below. This mixture was heated with shaking at 100° to 150° C. for 4.5 hours under 135 atm. hydrogen pressure. Fractionation of the filtered product resulted in a quantitative recovery of cyclohexane, B. P., 80° to 81° C.; $n_D^{25}$, 1.4238–1.4245.

The nickel molybdite catalyst used for effecting this reaction was prepared as follows:

Seventeen hundred sixty-six grams of ammonium paramolybdate [$(NH_4)_6Mo_7O_{24}\cdot 4H_2O$], equivalent to 10 moles of $MoO_3$, was dissolved in 5000 cc. of distilled water and neutralized by the addition of 900 cc. of 28% aqueous ammonia. The resulting solution of ammonium molybdate [$(NH_4)_2MoO_4$], containing 1.9 moles excess ammonia, was then added with stirring, at room temperature, to a solution of nickel nitrate, prepared by dissolving 2908 g. of nickel nitrate hexahydrate [$Ni(NO_3)_2\cdot 6H_2O$], equivalent to 10 moles of nickel salt, in 5000 cc. of distilled water. A pale green precipitate was formed in an acid slurry having a pH of approximately 4.0 by alkaline-acid paper. The pH of the slurry was adjusted to 7.0 (Beckmann pH meter) by the addition of 500 cc. of 28% aqueous ammonia. The precipitate was then washed, filtered, dried, and calcined at 400° C., for 18 hours. The calcined product, by analysis, was found to contain 23.2% nickel and 46.4% molybdenum.

The calcined product, prepared as described above, was reduced in hydrogen at gradually increasing temperatures up to 550° C. for a total of 25 hours, of which period 18 hours was at 550° C. The reduced product was highly pyrophoric and glowed on exposure to air. Analysis of the reduced material showed it to contain 26.66% nickel and 53.1% molybdenum corresponding to $NiMoO_2/0.1Mo_2O_3$.

Example II

Diisobutylene (100 ml.) was converted to 2,2,4-trimethylpentane in 85% conversion by hydrogenation in the presence of 10 grams of the nickel molybdite catalyst prepared as described in Example I. The reaction was conducted in a 400 ml. pressure reactor under a hydrogen partial pressure of 560 atm. during 10 hours at 250° C.

Example III

Cyclopentadiene was vaporized at a constant rate of 0.45 mole/hour and fed into a stationary-bed reactor containing 50 ml. of 8–14 mesh nickel molybdite catalyst, which was maintained at a temperature of 450°±20° C. under atmospheric pressure. The catalyst was prepared as described in Example I. Simultaneously, a reducing gas comprised of a mixture of ammonia and hydrogen in a 2:1 mole ratio was passed into the reactor at a constant rate of 0.75 mole/hour; thus, the calculated contact time of the combined gases with the catalyst was 2.5 seconds. The effluent gases from the reactor were collected in receivers cooled to —80° C. and the liquid so recovered was fractionated. The product was identified as cyclopentene by its boiling point, 43° to 44° C., and by analysis. Calc'd. for $C_5H_8$: C, 88.23%; H, 11.76%. Found: C, 88.39%; H, 12.12%. The cyclopentene was obtained in up to 40% conversion, together with unreacted cyclopentadiene suitable for recycling in the hydrogenation process.

Example IV

A 400-ml. pressure reactor was charged with 83 g. (1.0 mole) of cyclohexene and 8 g. of copper molybdite catalyst, prepared by a method analogous to that described in Example I for nickel molybdite. This mixture was heated with shaking at 200° C. under 135 atm. of hydrogen pressure for 4.5 hours. The reaction product was cyclohexane in quantitative conversion. This product boiled at 80° to 81° C. and failed to decolorize minute amounts of a 5% solution of bromine in carbon tetrachloride.

Example V

Acetone (100 g., 1.7 moles) was hydrogenated quantitatively to isopropanol by treatment in a 400-ml. pressure reactor with hydrogen at 80° C. to 150° C. and 120 to 135 atm. pressure for 4 hours in the presence of 2.5 g. of the nickel molybdite catalyst prepared as described in Example I.

Example VI

Acetone (100 g., 1.7 moles) was converted to isopropanol by treatment in a 400-ml. pressure reactor with hydrogen at 150° C. and 200 atm. pressure for 3 hours in the presence of 10 g. of a cobalt molybdite catalyst, prepared by a method analogous to that described in Example I for nickel molybdite.

Example VII

Tetrahydrofuran (100 ml.), in which there was suspended 10 g. of the nickel molybdite catalyst prepared as described in Example I, was shaken at 300° C. under hydrogen at a partial pressure of 560 atm. for 8 hours in a 400 ml. pressure reactor. The products formed were butanol-1 in 14% conversion and n-butane in 14% conversion.

Example VIII

A 400 ml. pressure reactor was charged with 100 ml. of ethyl acetate and 10 g. of the nickel molybdite catalyst prepared as described in Example I. This mixture was heated with shaking at 250° C. under a hydrogen partial pressure of 560 atm. for 9 hours. The products recovered were ethanol in 11.8% conversion and diethyl ether in 6.6% conversion.

Example IX

A solution of 62 g. (0.5 mole) of nitrobenzene in 100 ml. of methanol was placed in a 400-ml. pressure reactor and shaken with hydrogen at 80° C. under 150 atm. of hydrogen pressure for 45 minutes in the presence of 5 g. of the nickel molybdite catalyst of Example I. The product obtained was aniline in quantitative conversion.

Example X

Benzonitrile (103 g., 1.0 mole) was submitted to hydrogenation in a 400-ml. pressure reactor with hydrogen at 100° to 150° C. and 135 to 200 atm. pressure for 6 hours in the presence of 5 g. of the nickel molybdite catalyst prepared as described in Example I. The reduction products obtained were benzylamine in 23% conversion and 2,4,5-triphenylimidazole in 9% conversion.

Example XI

Propionitrile (110 g., 2.0 moles) was reacted with hydrogen in a 400-ml. pressure reactor at 125° C. and 200 atm. pressure for 4.5 hours in the presence of 5 g. of the nickel molybdite catalyst prepared as described in Example I. The product was a 2:1 mixture of di-n-propylamine and n-propylamine.

Example XII

One hundred twenty grams (2.0 moles) of acetic acid was mixed with 5 grams of the nickel molybdite catalyst prepared as described in Example I and the mixture reacted with hydrogen in a 400 ml. pressure reactor at 200° to 250° C. under 700 to 1000 atm. pressure for 6 to 8 hours. On fractionation of the filtered product, ethyl acetate was recovered in 54 to 57% conversion.

Example XIII

One hundred grams of benzene (1.3 moles) was mixed with 5 grams of the nickel molybdite catalyst prepared as described in Example I and the mixture reacted with hydrogen in a 400 ml. pressure reactor at 150° to 175° C. under hydrogen at 150 to 200 atm. pressure for 3 hours. The product was cyclohexane ($n_D^{25}=1.4232$) which was obtained in quantitative conversion.

Example XIV

One hundred grams of acetone (1.7 moles) was mixed with 10 grams of a zinc molybdite catalyst prepared by a method analogous to that described in Example I and the mixture reacted with hydrogen in a 400 ml. reactor at 210° to 220° C. under a hydrogen pressure of 900 to 975 atm. for 9.5 hours. Isopropanol was obtained in 70% conversion.

Example XV

A 400 ml. reactor was charged with 112 g. (1.0 mole) of 1-octene and 10 g. of zinc molybdite catalyst, prepared by a method analogous to that described in Example I, and the mixture reacted with hydrogen at 200° to 226° C. under 800 to 1000 atm. hydrogen pressure for 8 hours. The reaction product consisted of n-octane in quantitative conversion.

In effecting hydrogenations with metal molybdite catalysts, pressures ranging from atmospheric up to the maximum permitted by the mechanical limitations of the equipment can be employed. However, since the use of pressures in excess of 1500 atmospheres does not result in any advantages from the standpoint of yield of desired product or reaction rate, this represents the practical upper limit of pressure. For best results in batchwise operation, pressures which are in excess of 10 atmospheres, and generally above 50 atmospheres are used, since under such conditions satisfactory reaction rates are obtained. As illustrated in Example III, good reaction rates are obtained in continuous hydrogenation processes at atmospheric pressure.

Hydrogenation processes involving metal molybdite catalysts can be carried out in the presence or absence of a solvent or diluent. For each individual reaction system, the choice will be governed by such considerations, as need for providing a medium which will afford better than usual contact between reactants and catalyst, or need for simplifying the recovery of products, or need for exerting other beneficial effects upon an otherwise less efficient process. Suitable solvents or diluents are water, alcohols, ethers, or hydrocarbons. Specific examples of organic solvents are methanol, ethanol, cyclohexanol, isopropanol, dioxane, diethyl ether, cyclohexane, etc.

The catalysts used in the practice of this invention are the metal molybdites described in our copending application U. S. Serial No. 111,982, filed August 23, 1949, now U. S. Patent 2,572,300, of which the present application is a continuation-in-part. These molybdites exist in two series, in the first of which the molybdenum is present in the quadrivalent state corresponding to the oxide MoO₂ and the hypothetical acid H₂MoO₃, while in the second series the molybdenum exists in the bivalent state corresponding to the oxide MoO and the hypothetical acid H₂MoO₂. Thus a nickel molybdite has the formula NiMoO₂, a zinc molybdite has the formula ZnMoO₃, cobalt molybdites have formulas corresponding to CoMoO₂ and CoMoO₃ and a copper molybdite has the formula CuMoO₃. Preferred catalysts because of their high degree of activity and selectivity, are the molybdites of nickel, cobalt, and copper. These molybdites may contain modifiers or promoters such as iron, barium, cadmium, chromium, thorium, cobalt, copper, etc. if desired, and they may be employed in the form of pellets or as finely divided powders. They may also be used as such or extended on inert supports such as charcoal, alumina, silica, etc. The particular physical form of the catalyst for maximum activity depends upon the condition under which the hydrogenation reaction is to be effected. Thus, for vapor or liquid phase continuous operation it is best to have the catalyst in the form of pellets, thus minimizing mechanical losses. If the process is to be operated as a batch operation, it is best that the catalyst be in finely divided form because in this way maximum catalyst activity is attained.

The amount of catalyst employed depends upon such interdependent variables as temperature, pressure, desired mode of operation, desired duration of contact, kind of compound being hydrogenated, etc. In general, the amount of catalyst used is that needed to bring about reaction at a suitable rate under the conditions employed. Usually, in batch operation the amount will vary from about 0.01% to about 10% by weight of the compound being hydrogenated.

In continuous operation the weight of material being hydrogenated at any given instant is ordinarily less than the weight of the catalyst, but the total weight of material which may be hydrogenated during the active life of the catalyst is usually at least ten times the catalyst weight.

When the activity of the catalyst decreases or disappears through prolonged use, it may be restored by oxidizing the spent molybdite in air or oxygen at temperatures up to 500° C. and then reducing the resulting molybdate back to molybdite by the procedure illustrated in Example I.

In general the process of this invention is operable at temperatures within the range of from 25° to 500° C. As a rule, the process is operated at temperatures in the range of 70° to 450° C. because under these conditions reaction takes place at a practical rate with the production of the desired products in maximum yields.

The process of this invention can be carried out either as a batch operation or as a liquid or vapor phase semi-continuous or continuous operation.

The examples have illustrated the hydrogenation of ethyl acetate, tetrahydrofuran, benzonitrile, propionitrile, nitrobenzene, acetone, cyclohexene, cyclopentadiene, diisobutylene, benzene, 1-octane, and acetic acid. It is to be understood, however, that the process of this invention is generally applicable to the hydrogenation of any organic compound capable of undergoing hydrogenation, with hydrogen in the presence of a hydrogenation catalyst. Examples of such compounds are those which have carbon-carbon unsaturation, those which have carbon-nitrogen unsaturation, those which have nitrogen-oxygen unsaturation, those which have carbon directly bonded to oxygen by a single or by a double bond, those which have sulfur-oxygen unsaturation, and sulfur compounds of the following general formulae:

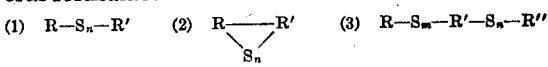

in which $m$ and $n$ stand for small integers from 1 to 10 and R, R′, and R″ stand for aliphatic or cycloaliphatic groups. These groups may be saturated or unsaturated and may contain also functional groups or linkages such as hydroxyl, amino, substituted amino, halogen, carbonyl, carboxyl, aryl, nitro, ether, amide, or ester groups. Specially useful compounds falling within the above classes are those compounds which have carbon joined by a multiple bond to another atom.

The compounds having carbon-carbon unsaturation fall into three main groups, namely, those in which the unsaturation is ethylenic, those in which the unsaturation is benzenoid, and those in which the unsaturation is acetylenic. Subclasses of these compounds are those having mixed unsaturation.

Examples of compounds having ethylenic unsaturation are butadiene cyclic sulfone, dihydropyran, 2-butenediol-1,4 maleic esters, and the olefin hydrocarbons such as ethylene, propylene, butylenes, cyclopentene, cyclohexene, etc., and polymeric hydrocarbons such as rubber and the like.

Compounds having benzenoid unsaturation are benzene, phenol, cresols, xylenols, naphthalene, naphthols, diphenyl, diphenylmethane, aniline, toluidines, N-methylaniline, naphthylamines, benzidine, p,p′-phenylenediamine, pyridine, picoline, and the like.

Compounds having carbon-nitrogen unsaturation include the nitriles, oximes, Schiff bases, azines, and the like.

Examples of nitriles are acetonitrile, propionitrile, succinonitrile, adiponitrile, sebaconitrile, oleonitrile, stearonitrile, benzonitrile, and the like.

Examples of oximes are acetoxime, acetaldoxime, diacetyl monoxime, benzaldoxime, camphoroxime, and the like.

Examples of Schiff's bases are benzal phenylimine, phenyl quinonediimine, and the like.

Examples of azines are benzalazine, diphenylketazine, and the like.

Compounds having carbon directly bonded to oxygen by a single or double bond fall into four groups, namely, the oxo and non-oxo carbonyl compounds, ethers, and the alcohols.

Examples of oxo carbonyl compounds are acetone, methyl ethyl ketone, dipropyl ketone, dioctadecyl ketone, mesityl oxide, phorone, camphor, acetaldehyde, benzaldehyde, dodecanal-1, and the like.

Examples of non-oxo carbonyl compounds are carboxylic acids, their esters, amides, and imides. Examples are acetic acid, propionic acid, tartaric acid, oleic acid, linoleic acid, ricinoleic acid, China Wood oil, sperm oil, ethyl laurate, methyl stearate, sorbic acid, palmitic acid, palmitamide, rosin, benzoic acid, phthalic acid, phthalimide, and the like.

Examples of ethers are tetrahydrofurane, phenyl methyl ether, diethyl ether, methyl amyl ether, naphthyl ethyl ether, and the like.

Examples of alcohols are benzyl alcohol, ethyl alcohol, dodecanol-1, octadecanol-1, cyclohexanol, and the like.

Compounds having nitrogen-oxygen unsaturation are the nitro and nitroso compounds such as nitrobenzene, nitrotoluene, 1,4-dinitrobenzene, nitrosobenzene, nitropropane, nitrobutane, and the like.

Compounds having sulfur to oxygen unsaturation are the sulfonic and sulfinic acids such as benzene sulfonic acid, benzene sulfinic acid, and the like.

Examples of sulfur compounds of Formula 1 are ditertiary butyl sulfide, di-n-amyl sulfide, methyl dodecyl sulfide, di-isoamyl disulfide, dioctyl disulfide, didodecyl sulfide, diallyl sulfide, diallyl disulfide, diallyl trisulfide, allyl butyl sulfide, dioleyl sulfide, dicyclohexyl sufide, dibornyl disulfide, cyclohexyl methyl sulfide, dicyclopentyl disulfide, di-p-menthenyl sulfide, and the like.

Sulfides of Formula 2 are ethylene sulfide, ethylene disulfide, divinyl disulfide, trimethylene sulfide, trimethylene disulfide, dihydrothiophene, tetrahydrothiophene, tetrahydrothiopyrane, thioxane, 1,4-dithiane, sym.-trithiane, and the like.

Sulfides of Formula 3 are the thioacetals such as methylene-bis-octyl sulfide, ethylidene-bis-dodecyl sulfide, thioketals such as 2-propylidene-bis-heptyl sulfide, thiodiglycol, bis(beta-oxyethyl) disulfide, sorbityl dodecyl sulfide, disorbityl disulfide, beta,beta'-diaminodiethyl disulfide, methylene-bis-thioglycolic acid, and the like.

Other sulfur compounds operable in the practice of this invention are the thioaldehydes and the thioketones such as 2-ethyl thiohexanal-1, dimethyl thioketone, methyl ethyl thioketone, and the like.

The process of this invention is an improvement over the art in providing a catalyst which has a high degree of selectivity in many types of hydrogenations, for example, in the hydrogenation of carboxylic acids to esters. These catalysts are rugged, highly resistant to poisoning, and versatile in functioning under acid, or alkaline conditions.

As many apparently widely different embodiments of this invention may be made without departing from the spirit and scope thereof, it is to be understood that this invention is not limited to the specific embodiments thereof except as defined in the appended claims.

We claim:

1. In a process for the hydrogenation of an organic compound capable of undergoing hydrogenation with hydrogen in the presence of a hydrogenation catalyst, the improvement which comprises contacting said organic compound at a temperature of 25° to 500° C. with hydrogen and a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_2$ and the acid having the formula $H_2MoO_3$.

2. Process as set forth in claim 1 wherein said metal molybdite is a nickel molybdite having the formula $NiMoO_2$.

3. Process as set forth in claim 1 wherein said metal molybdite is a zinc molybdite having the formula $ZnMoO_3$.

4. Process as set forth in claim 1 wherein said metal molybdite is a cobalt molybdite having the formula $CoMoO_2$.

5. Process as set forth in claim 1 wherein said metal molybdite is a copper molybdite having the formula $CuMoO_3$.

6. Process as set forth in claim 1 wherein said molybdite is a cobalt molybdite having the formula $CoMoO_3$.

7. Process as set forth in claim 1 wherein said organic compound capable of undergoing hydrogenation is tetrahydrofuran.

8. Process as set forth in claim 1 wherein said organic compound capable of undergoing hydrogenation is tetrahydrofuran and said metal molybdite is a nickel molybdite having the formula $NiMoO_2$.

9. In a process for the hydrogenation of an organic compound having a plurally bonded carbon atom and capable of undergoing hydrogenation with hydrogen in the presence of a hydrogenation catalyst, the improvement which comprises contacting said organic compound having a plurally bonded carbon atom at a temperature of 70° to 450° C. with hydrogen and a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_2$ and the acid having the formula $H_2MoO_3$.

10. Process as set forth in claim 9 wherein said organic compound having a plurally bonded carbon atom is benzonitrile.

11. Process as set forth in claim 9 wherein said organic compound having a plurally bonded carbon atom is benzonitrile and said metal molybdite is a nickel molybdite having the formula $NiMoO_2$.

12. In a process for the hydrogenation of an organic compound having a carbon-to-oxygen double bond and capable of undergoing hydrogenation with hydrogen in the presence of a hydrogenation catalyst, the improvement which comprises contacting said organic compound having a carbon-to-oxygen double bond at a temperature of 70° to 450° C. with hydrogen and a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_2$ and the acid having the formula $H_2MoO_3$.

13. Process as set forth in claim 12 wherein said organic compound having a carbon-to-oxygen double bond is acetic acid.

14. Process as set forth in claim 12 wherein said organic compound having a carbon-to-oxygen double bond is acetic acid and said metal molybdite is a nickel molybdite having the formula $NiMoO_2$.

15. In a process for the hydrogenation of an organic compound having nitrogen-oxygen unsaturation and capable of undergoing hydrogenation with hydrogen in the presence of a hydrogenation catalyst, the improvement which comprises contacting said organic compound having nitrogen-oxygen unsaturation at a temperature of 70° to 450° C. with hydrogen and a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_2$ and the acid having the formula $H_2MoO_3$.

16. Process as set forth in claim 15 wherein said organic compound having nitrogen-oxygen unsaturation is nitrobenzene.

17. Process as set forth in claim 15 wherein said organic compound having nitrogen-oxygen unsaturation is nitrobenzene and said metal molybdite is a nickel molybdite having the formula $NiMoO_2$.

18. In a process for the hydrogenation of an organic compound having carbon-to-carbon unsaturation and capable of undergoing hydrogenation with hydrogen in the presence of a hydrogenation catalyst, the improvement which comprises contacting said organic compound having carbon-to-carbon unsaturation at a temperature of 70° to 450° C. with hydrogen and a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_2$ and the acid having the formula $H_2MoO_3$.

19. In a process for the hydrogenation of an unsaturated hydrocarbon, the improvement which comprises contacting said unsaturated hydrocarbon at a temperature of 70° to 450° C. with hydrogen and a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_2$ and the acid having the formula $H_2MoO_3$.

20. In a process for the hydrogenation of cyclohexene to cyclohexane, the improvement which comprises contacting said cyclohexene at a temperature of 70° to 450° C. with hydrogen and a molybdite of a metal whose ions are soluble in aqueous ammonia in amount greater than that stoichiometrically required to precipitate the metal ion, said metal molybdite being the metal salt of an acid selected from the class consisting of the acid having the formula $H_2MoO_2$ and the acid having the formula $H_2MoO_3$.

21. In a process for the hydrogenation of cyclohexene to cyclohexane, the improvement which comprises contacting said cyclohexene at a temperature of 70° to 450° C. with hydrogen and a nickel molybdite having the formula $NiMoO_2$.

HERRICK R. ARNOLD.
JAMES E. CARNAHAN.

REFERENCES CITED

The following references are of record in the file of this patent:

UNITED STATES PATENTS

| Number | Name | Date |
|---|---|---|
| 2,077,421 | Lazier | Apr. 20, 1937 |